United States Patent
Evans et al.

(10) Patent No.: US 8,314,366 B2
(45) Date of Patent: Nov. 20, 2012

(54) REMOVABLE CHISEL BLADE FOR A PORTABLE HEATING ELEMENT

(76) Inventors: Mark Stephen Evans, Soddy-Daisy, TN (US); Baker Wade Whisnant, Atlanta, GA (US)

( * ) Notice: Subject to any disclaimer, the term of this patent is extended or adjusted under 35 U.S.C. 154(b) by 531 days.

(21) Appl. No.: 12/589,450

(22) Filed: Oct. 23, 2009

(65) Prior Publication Data

US 2010/0237058 A1    Sep. 23, 2010

Related U.S. Application Data

(60) Provisional application No. 61/210,374, filed on Mar. 18, 2009.

(51) Int. Cl.
*B23K 3/03* (2006.01)
(52) U.S. Cl. .............. 219/229; 228/55; 30/167
(58) Field of Classification Search .......... 219/229; 228/55; 30/167
See application file for complete search history.

(56) References Cited

U.S. PATENT DOCUMENTS

| | | | |
|---|---|---|---|
| 1,584,371 A | | 5/1926 | Griffiths |
| 1,809,718 A * | | 6/1931 | McNeil ............ 30/140 |
| 2,107,220 A * | | 2/1938 | Schulz ............. 30/140 |
| 2,185,266 A * | | 1/1940 | Raffles ............ 219/239 |
| 2,256,648 A * | | 9/1941 | Preisser ........... 219/228 |
| 2,330,853 A * | | 10/1943 | Wintercorn ....... 30/32 |
| 2,352,010 A * | | 6/1944 | Robbins .......... 30/140 |
| 2,536,844 A * | | 1/1951 | Frederick et al. .. 30/140 |
| 2,700,096 A * | | 1/1955 | Clements ......... 30/140 |
| 2,816,606 A * | | 12/1957 | Dehart et al. ...... 157/13 |
| 3,208,142 A | | 9/1965 | Osrow |
| 3,352,011 A | | 11/1967 | Alexander |
| 3,574,937 A | | 4/1971 | Wolf |
| 4,349,961 A * | | 9/1982 | Pendleton ........ 30/168 |
| 4,930,176 A * | | 6/1990 | Gelman .......... 15/4 |
| 5,208,895 A * | | 5/1993 | Hoover et al. .... 392/404 |
| 5,581,889 A * | | 12/1996 | Reuter ............ 30/142 |
| 5,889,257 A | | 3/1999 | Schader |
| 7,030,339 B2 | | 4/2006 | Nagase et al. |
| 2010/0237058 A1* | | 9/2010 | Evans et al. ....... 219/229 |

OTHER PUBLICATIONS

Non Patent Literature Tire groover (2 pages Attached) Web Page.
Tread Doctor Knobby Cutting Tool Trademark Filing Date Sep. 10, 2012.

* cited by examiner

*Primary Examiner* — Laura Menz
(74) *Attorney, Agent, or Firm* — Jerome E Sacks

(57) ABSTRACT

A chisel blade with a permanently attached shaft is disclosed. The chisel blade and shaft are dimensioned and configured such that shaft is removably attachable to a portable heating element. The chisel blade with an attached shaft may include a portable soldering iron with the soldering tip removed. In the two possible embodiments, the chisel blade has a rectangular shape with a beveled cutting surface having a straight cutting edge. In a third embodiment, the chisel blade is concave and the beveled cutting edge is concave.

13 Claims, 5 Drawing Sheets

REMOVABLE CHISEL BLADE FOR A PORTABLE HEATING ELEMENT

CROSS-REFERENCE TO RELATED APPLICATIONS

This application claims the benefit of the U.S. Provisional Patent Application No. 61/210,374 filed Mar. 18, 2009 by the present inventors. This provisional patent application is incorporated herein by reference.

TECHNICAL FIELD

The present invention relates generally to cutting instruments. More particularly the invention relates to cutting instruments in which the cutting blade is heated.

BACKGROUND

There are many inventions directed to removable blades that are attached to a hand-held handle. There are also inventions in which a blade is attached to a hand-held heating element to serve a specific function such as cutting honeycombs or shaping dental molds. There are also inventions in which a hand-held heating element is used with a removable blade. These are called tire groovers and they are used to cut grooves in the rubber without applying excessive heat that would damage the rubber. However, some of these inventions are customized, expensive tools. Others have blades that are thin and fragile. Thus, there is a need for an inexpensive tool that is used to trim the knobs of a tire on a dirt bike or similar tire after the tire is used in a race such that the knob's edges are restored to their original sharpness. Furthermore, the tool should have a durable blade that is easy to use, keeps its sharpness for extended periods, and is easily resharpened.

SUMMARY

The present invention provides a low cost, easily manufactured device that allows the user to trim the knobs of off road tires easily and effectively. The invention is a chisel blade with an attached chisel shaft that replaces the soldering tip commonly used in soldering irons. The invention is useful for trimming the knobs of dirt bike tires without damaging them. The invention is used to trim motorcycle and dirt bike tires to recondition them in the field after being used in off-road motorcycle and dirt bike competitions and recreational use. The invention provides the correct amount of heat for trimming the tire knobs easily and without damaging the remaining rubber on the tire. Furthermore, the blade retains its sharpness and strength for a long time.

The present invention has a simple but effective design that is inexpensively manufactured and may be deployed simply by replacing the soldering tip of a soldering iron or similar heating device with the removable chisel blade. The invention provides a useful tool for trimming knobby tire treads and other tire treads used in competition and recreational activities. Furthermore, unlike other products that are designed to cut tire treads, the removable chisel blade is essentially unbreakable, retains its sharpness for extended periods of time, and is resharpened easily with tool sharpeners commonly available to the consumer.

DETAILED DESCRIPTION

As used in this specification and claims, the phrase soldering iron refers to a hand held soldering iron that has a removable soldering iron tip. The term removable chisel blade refers to a chisel blade with a shaft attached.

In the following description, the terms top, bottom, front, back, left and right refer to the figure where each reference is first introduced. The term concave upward refers to a curved shape that in the figure it refers to "holds water". Similarly, concave to the right is a curved shape that when rotated counterclockwise approximately 90 degrees becomes concave upwards.

Figure 1:
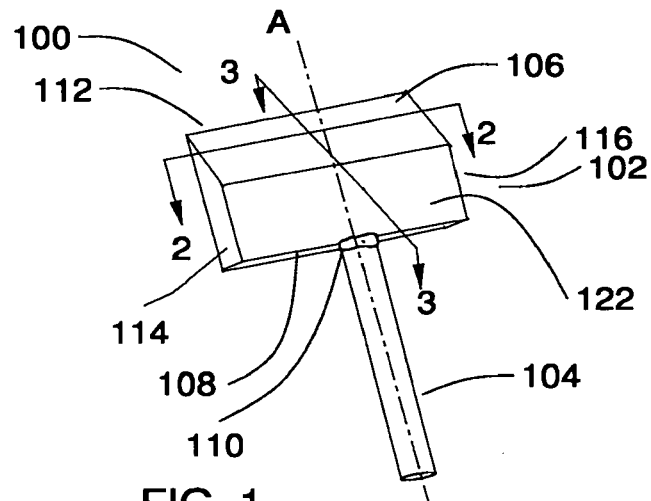
FIG. 1 illustrates a front perspective view of a first embodiment of the removable chisel blade.
Figure 4:
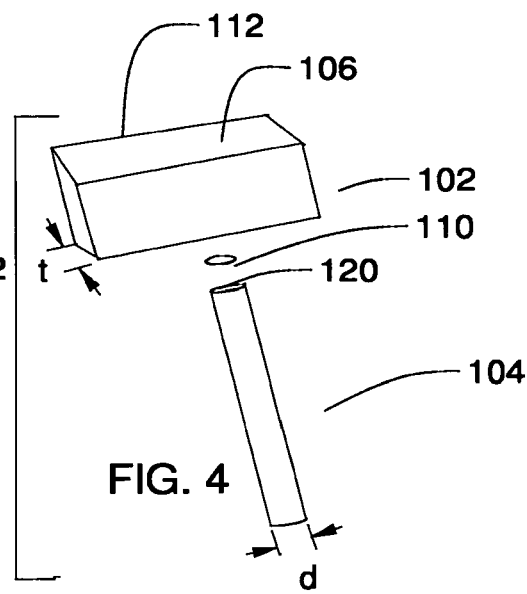
FIG. 4 illustrates an exploded view of the removable chisel blade of FIG. 1.
Figure 2:
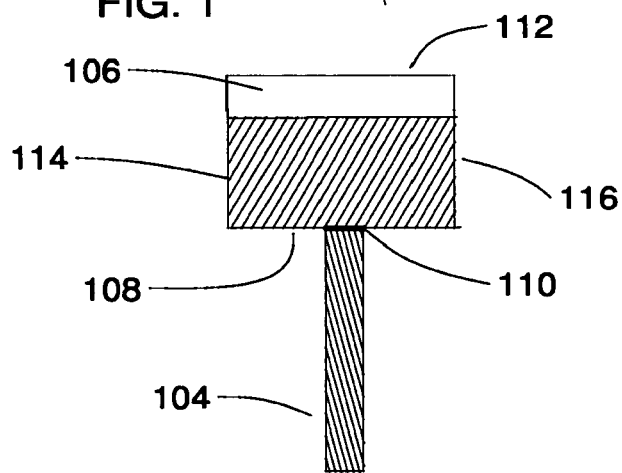
FIG. 2 illustrates a front view of the removable chisel blade of FIG. 1.
Figure 3:
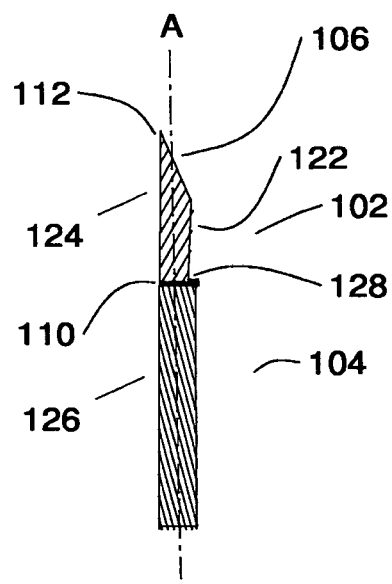
FIG. 3 illustrates a left side view of the removable chisel blade of FIG. 1.

FIGS. 1 through 4 illustrate a first embodiment of the invention. Referring to FIG. 1, the removable chisel blade 100 of the first embodiment is comprised of a chisel blade 102 and a chisel shaft 104. The chisel blade 102 has the shape of a flat rectangular solid that has been beveled so it has a flat surface 106 with a cutting edge 112. The cutting edge 112 is disposed at the top back of the chisel blade 102. The chisel shaft 104 is a cylindrical solid. As seen in FIGS. 2 and 3 the chisel blade 102 is joined to the chisel shaft 104 with a weld 110.

Referring to FIGS. 1 through 4, the top 120 of the chisel shaft 104 has a circular shape and is attached at the bottom 108 of the chisel blade 102 equidistant from the left side 114 and the right side 116 of the chisel blade 102. The axial direction A of the chisel shaft 104 is parallel to the left 114 and the right 116 sides of the chisel blade 102. The back 126 of the chisel shaft 104 is aligned with the back 124 of the chisel blade 102 as shown in FIG. 3. If the diameter d of the chisel shaft 104 is larger than the thickness t of the chisel blade 102, then the chisel shaft top 120 may have a protruding ridge 128 at the front 122 of the chisel blade 102.

Figure 5:
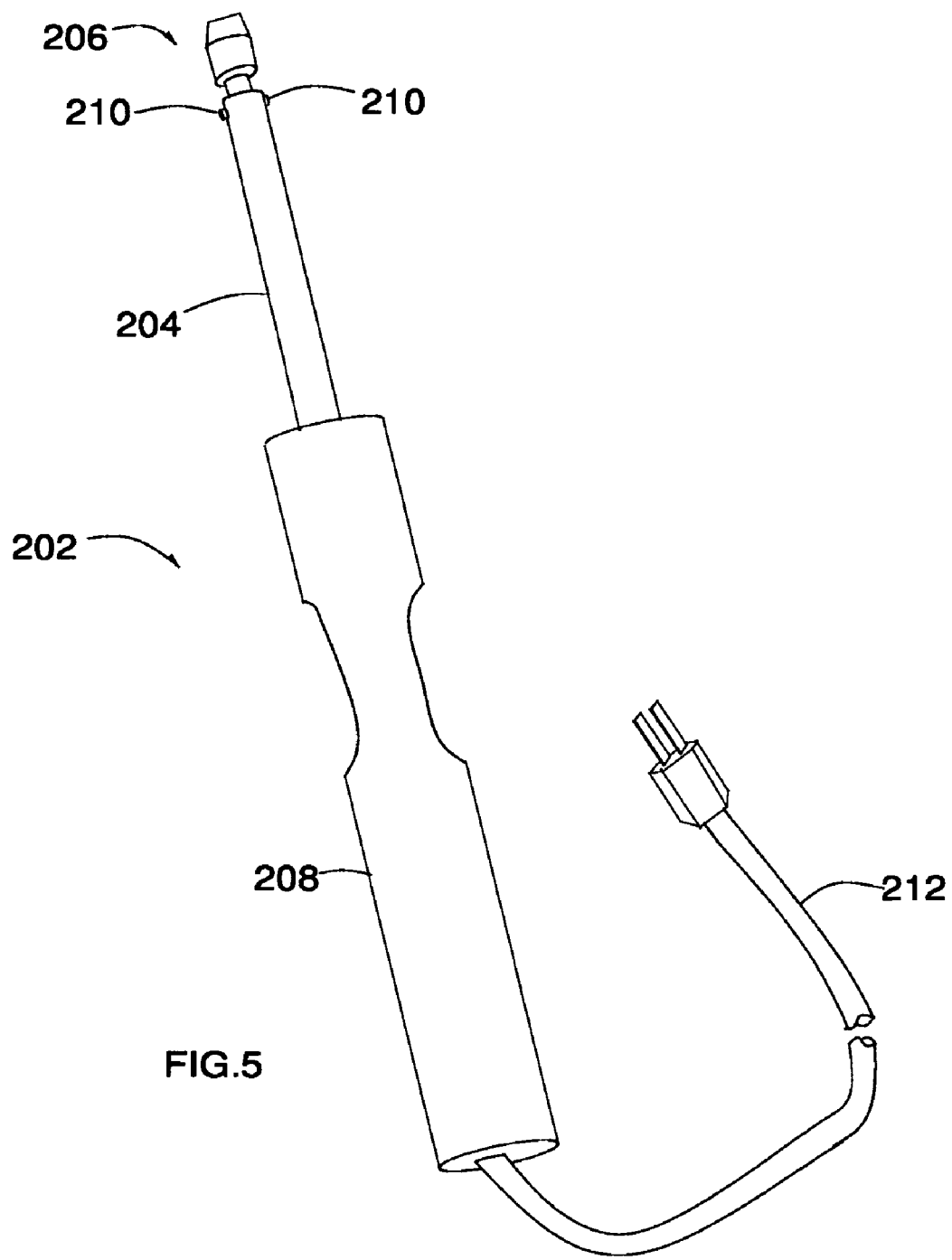
FIG. 5 illustrates a prior art soldering iron with a soldering tip.

FIG. 5 illustrates a prior art soldering iron 202. The prior art soldering iron has a removable soldering tip 206. The soldering iron 202 has a tubular shaft 204, a handle 208 and an electrical cord 212. The soldering iron tip 206 is secured to the shaft 204 with adjusting screws 210.

Figure 6:
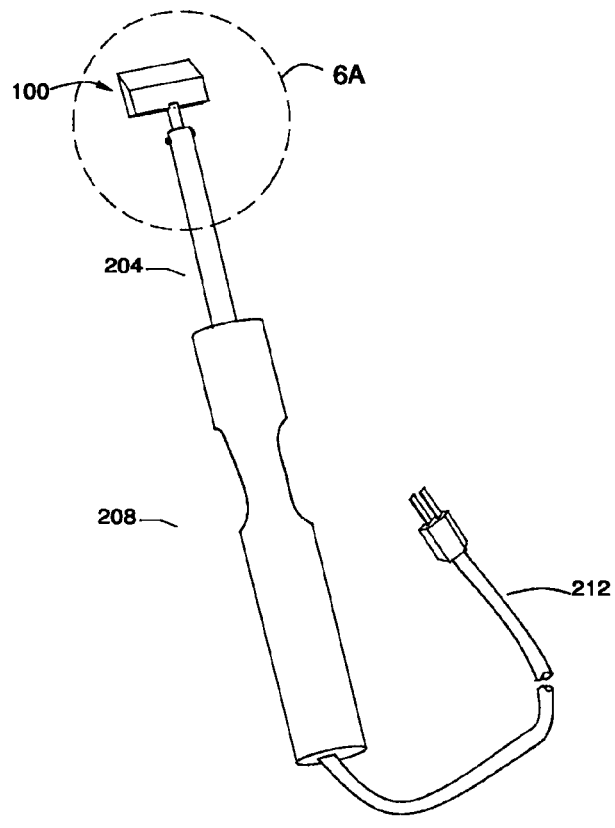
FIG. 6 illustrates the removable chisel blade attached to a soldering iron.
Figure 6A:
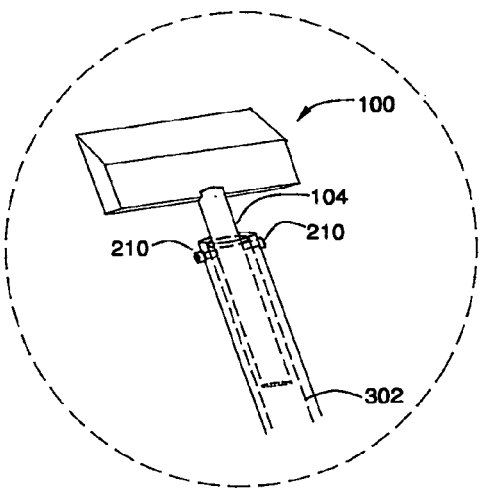
FIG. 6A illustrates a close up view of FIG. 6 illustrating the chisel blade attached to the soldering iron.

FIG. 6 illustrates the disposition of the removable chisel blade 100 in the soldering iron shaft 204. FIG. 6A illustrates a detail of the soldering iron with the removable chisel blade 100 installed. To install the removable chisel blade 100 on the soldering iron 202, the soldering iron tip is removed. Then the adjusting screws 210 of the soldering iron shaft 204 are loosened sufficiently such that the chisel shaft 104 of the removable chisel blade is inserted in the interior cylinder 302 of the soldering iron shaft 204. The adjusting screws 210 are then tightened securing the chisel shaft 104.

Figure 7:
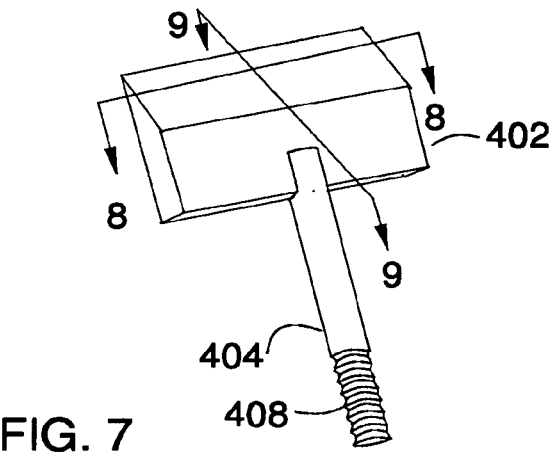
FIG. 7 illustrates a front perspective view of a second embodiment of the removable chisel blade.
Figure 10:
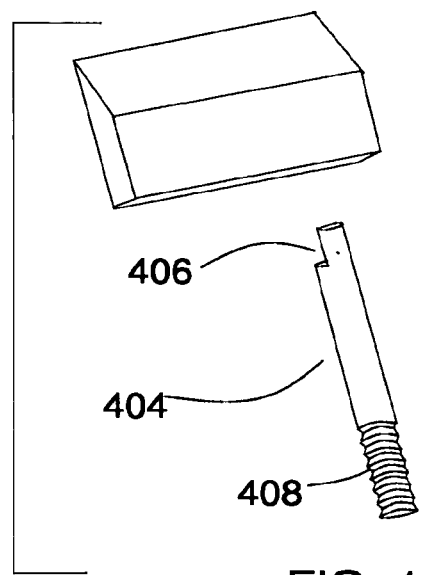
FIG. 10 illustrates an exploded view of the second embodiment of the removable chisel blade.
Figure 8:
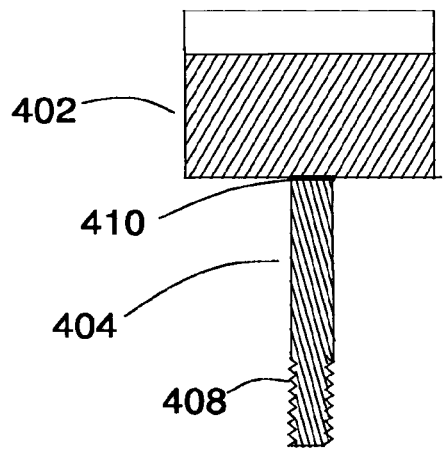
FIG. 8 illustrates a front view of the second embodiment of the removable chisel blade.
Figure 9:
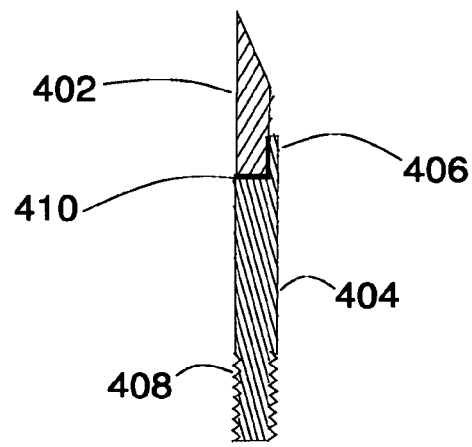
FIG. 9 illustrates a left side view of the second embodiment of the removable chisel blade.
Figure 11:
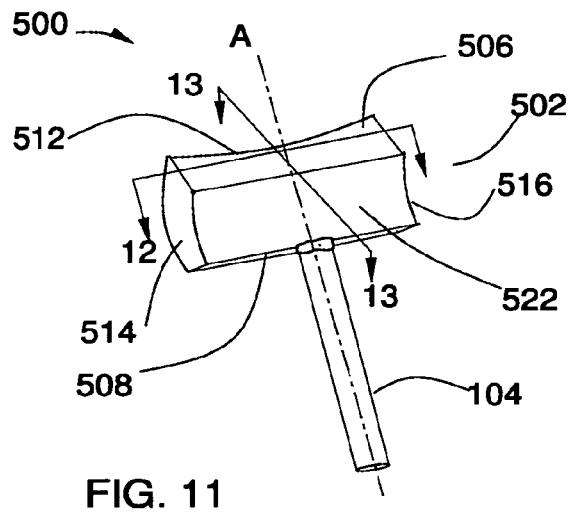
FIG. 11 illustrates a front perspective view of a third embodiment of the removable chisel blade.
Figure 14:
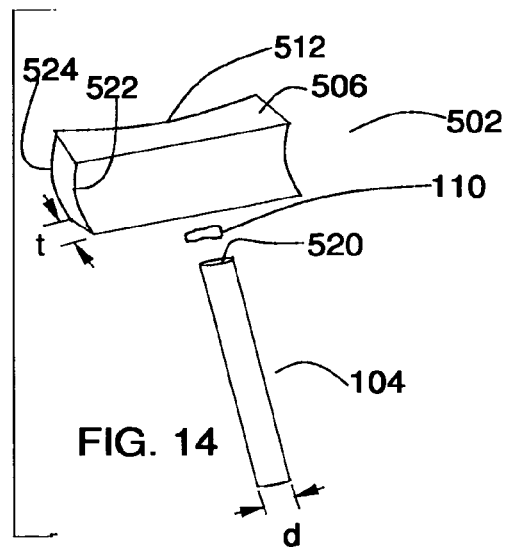
FIG. 14 illustrates an exploded view of the third embodiment of the removable chisel blade.

FIGS. 7 through 10 illustrate a second embodiment of the invention. Instead of the flat chisel shaft 104 of the first embodiment, a chisel shaft 404 with an L-shaped notched top 406 is provided as shown in FIGS. 7, 9 and 10 replaces the flat top 120 of the first embodiment. The notch 406 provides extra surface area for the weld 410 and presents a more pleasant appearance. The chisel shaft 404 has threads 408 disposed on the bottom portion of the chisel shaft 404. The threads 408 are configured to be used with a soldering iron that accepts threaded shafts. The threads 408 ensure excellent contact between the chisel shaft 404 and a soldering iron designed to accept a threaded tip.

Figure 12:
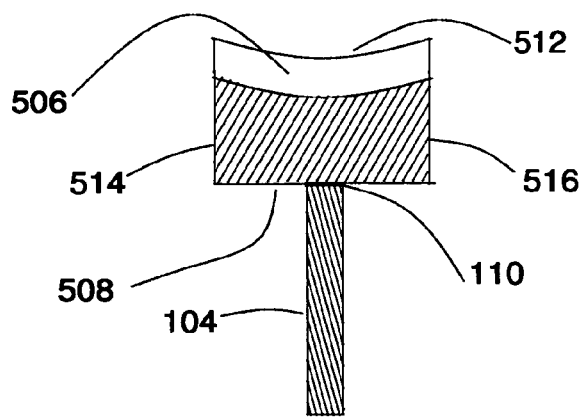
FIG. 12 illustrates a front view of the third embodiment of the removable chisel blade.
Figure 13:
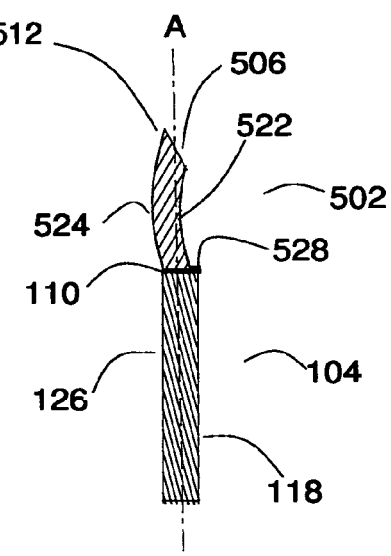
FIG. 13 illustrates a left side view of the third embodiment of the removable chisel blade.

FIGS. 11 through 14 illustrate a third embodiment of the invention. Instead of the beveled chisel blade 102 of the first embodiment, the blade body is concave and has a concave cutting edge. Referring to FIG. 12, the cutting edge 512 is upwardly concave. The back of the blade 524 is concave to the right as illustrated in FIG. 13.

Any dimensions, configurations or materials of the chisel blade and chisel shaft that are compatible with existing or newly designed soldering irons and function in a manner equivalent to the three embodiments presented herein are within the scope of this inventive concept.

The invention comprises the removable chisel blade or optionally the removable chisel blade with a soldering iron. As one example of a typical implementation, the chisel blade 102 is made from tool steel with the beveled flat surface ground to form a sharp cutting edge 112. The size of the chisel blade 102 comes in several sizes with widths from 20 mm (¾ inch) to 51 mm (2 in), a height of 20 mm (¾ inch) and a thickness of 4.0 mm (5/32 in). The chisel shaft 104 is made from a welding rod with a diameter selected to fit the sleeve of a soldering iron. Typical diameters are ¼ inch and ⅜ inch. Alternatively, the shaft may have threads to fit in a soldering iron that accepts soldering iron tips with threads.

Various modifications to the embodiments are within the inventive concept presented here. The electric soldering iron may be replaced by a portable propane-powered soldering iron or a soldering iron powered by a car battery or rechargeable portable battery. A shaft that has a different cross section, such as a hexagon, may replace the cylindrical solid shaft. Additionally, the shaft may have a bend in it. The chisel blade and chisel shaft may be made from single piece of material. The chisel shaft may be joined to the chisel blade by means other than welding, such as screws. The chisel blade may be permanently attached to the heating element so that it is not removable.

The disclosure presented herein presents three embodiments of the invention. These embodiments are to be considered as only illustrative of the invention and not a limitation of the scope of the invention. Various permutations, combinations, variations and extensions of these embodiments are considered to fall within the scope of this invention.

What is claimed is:

1. A tool for trimming tire knobs comprising:
   a chisel blade having a top and a bottom, the chisel blade having a cutting edge configured to cut tire knobs and a beveled cutting surface positioned at the top of the chisel blade;
   a shaft being permanently attached to the bottom of the chisel blade; and
   wherein the chisel blade with the attached shaft being dimensioned and configured so that it is removably attachable to a portable heating element.

2. The tool of claim 1 wherein the portable heating element is a portable soldering iron without a soldering tip.

3. The tool of claim 1 wherein the chisel blade with the attached shaft is permanently attached to the portable heating element.

4. The tool of claim 1 wherein the chisel blade has a thickness of 2 mm to 4 mm.

5. The tool of claim 1 wherein the chisel blade has a width of between 20 mm and 51 mm.

6. A tool for trimming knobs of a tire comprising:
   a chisel blade having a left side, a right side, a front side and a back side, a bottom and a top, the chisel blade having a beveled cutting surface with a cutting edge configured to cut tire knobs wherein the cutting edge of the beveled cutting surface is positioned at the top and the back side of the chisel blade;
   a shaft with a first end and a second end, the first end being permanently attached to bottom of the chisel blade; and
   wherein the chisel blade with the attached shaft is removably attachable to a portable heating element.

7. The tool for trimming knobs of a tire of claim 6 wherein a longitudinal axis of the shaft is perpendicular to the bottom of the chisel blade, and wherein a first end of the shaft is positioned midway between the left side and the right side of the chisel blade, and the longitudinal axis of the shaft is parallel to the back side of the chisel blade.

8. The tool for trimming knobs of a tire of claim 6 wherein the portable heating element is a portable soldering iron with the soldering tip removed.

9. The tool for trimming knobs of at tire of claim 6 wherein the front side and the back side of the chisel blade are parallel flat surfaces and wherein the cutting edge of the beveled cutting surface is a straight edge.

10. The tool for trimming knobs of a tire of claim 6 wherein the dimensions of the chisel blade have a width between 20 mm and 51 mm, have a height of 20 mm and have a thickness of between 2 mm and 4 mm.

11. The tool for trimming knobs of a tire of claim 6 wherein the back side of the chisel blade is concave and wherein the cutting edge of the beveled cutting surface is concave.

12. The tool of claim 1 wherein the beveled cutting surface has a cutting edge that is a straight edge.

13. The tool of claim 1 wherein the chisel blade additionally comprising a back side wherein the back side of the chisel blade is concave and wherein the cutting edge of the beveled cutting surface is concave.

\* \* \* \* \*